United States Patent
Lane et al.

(10) Patent No.: US 10,162,869 B2
(45) Date of Patent: Dec. 25, 2018

(54) TABLE OF CONTENTS FOR SEARCH QUERY REFINEMENT

(71) Applicant: MICROSOFT TECHNOLOGY LICENSING, LLC, Redmond, WA (US)

(72) Inventors: Mira Lane, Redmond, WA (US); Javier Garcia Flynn, Seattle, WA (US); Paul Ray, Redmond, WA (US); Evan Malahy, Seattle, WA (US); Derrick Connell, Bellevue, WA (US); Brian MacDonald, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/202,973

(22) Filed: Mar. 10, 2014

(65) Prior Publication Data
US 2014/0195521 A1    Jul. 10, 2014

Related U.S. Application Data

(63) Continuation of application No. 12/554,466, filed on Sep. 4, 2009, now Pat. No. 8,694,505.

(51) Int. Cl.
*G06F 3/0482* (2013.01)
*G06F 17/30* (2006.01)

(52) U.S. Cl.
CPC .... *G06F 17/30554* (2013.01); *G06F 17/3064* (2013.01); *G06F 17/30696* (2013.01); *G06F 17/30864* (2013.01)

(58) Field of Classification Search
CPC ................ G06F 17/30873; G06F 17/30696
USPC ......................................................... 707/765
See application file for complete search history.

(56) References Cited

U.S. PATENT DOCUMENTS

| | | | |
|---|---|---|---|
| 6,385,602 B1 | 5/2002 | Tso et al. | |
| 7,143,091 B2 | 11/2006 | Charnock et al. | |
| 7,324,989 B2 | 1/2008 | Silverbrook et al. | |
| 7,774,383 B2 * | 8/2010 | Acevedo-Aviles et al. ................. 707/805 | |

(Continued)

FOREIGN PATENT DOCUMENTS

| | | |
|---|---|---|
| EP | 0979470 B1 | 6/2008 |
| JP | 2007172571 A | 7/2007 |

(Continued)

OTHER PUBLICATIONS

"Office Action Received for Israel Patent Application No. 217873", dated Apr. 15, 2015, 3 Pages. (W/o English Translation).

(Continued)

*Primary Examiner* — Cheyne D Ly
(74) *Attorney, Agent, or Firm* — Shook, Hardy & Bacon, L.L.P.

(57) ABSTRACT

Computer-implemented methods and a computing system are provided for presenting a new user interface paradigm which allows users to explore facets related to a search query term while maintaining the original state of the search query term or staying within the confines of the user defined topic. The methods and system present facets or categories of relevant topics of a user generated search query term. The user may then explore these facets in a number of embodiments while maintaining the state of the search.

20 Claims, 10 Drawing Sheets

(56) References Cited

U.S. PATENT DOCUMENTS

| | | | |
|---|---|---|---|
| 8,111,255 B2 | 2/2012 | Park | |
| 2002/0091661 A1* | 7/2002 | Anick et al. | 707/1 |
| 2004/0133413 A1* | 7/2004 | Beringer | G06F 9/4443 703/22 |
| 2005/0027691 A1 | 2/2005 | Brin et al. | |
| 2006/0271565 A1* | 11/2006 | Acevedo-Aviles et al. | 707/100 |
| 2006/0288039 A1* | 12/2006 | Acevedo-Aviles | G06F 17/30994 |
| 2006/0294071 A1* | 12/2006 | Weare et al. | 707/3 |
| 2007/0011146 A1 | 1/2007 | Holbrook | |
| 2007/0050393 A1 | 3/2007 | Vogel et al. | |
| 2007/0067275 A1 | 3/2007 | Shekel | |
| 2007/0094241 A1 | 4/2007 | Blackwell et al. | |
| 2007/0118542 A1* | 5/2007 | Sweeney | 707/100 |
| 2007/0185836 A1* | 8/2007 | Handy-Bosma | G06F 17/30696 |
| 2007/0219945 A1 | 9/2007 | Wang et al. | |
| 2007/0233654 A1* | 10/2007 | Karlson et al. | 707/3 |
| 2008/0082509 A1* | 4/2008 | Bessieres | G06F 17/30899 |
| 2008/0189269 A1 | 8/2008 | Olsen | |
| 2008/0243778 A1* | 10/2008 | Behnen | G06F 17/30554 |
| 2008/0263033 A1 | 10/2008 | Vailaya et al. | |
| 2008/0270380 A1 | 10/2008 | Ohm et al. | |
| 2009/0094234 A1 | 4/2009 | Marvit et al. | |
| 2009/0198675 A1* | 8/2009 | Mihalik | G06F 17/30864 |
| 2009/0234849 A1* | 9/2009 | Erera | G06F 17/30864 |
| 2009/0292674 A1* | 11/2009 | Dasdan et al. | 707/3 |

FOREIGN PATENT DOCUMENTS

| | | |
|---|---|---|
| JP | 2009176274 | 8/2009 |
| RU | 2324220 C2 | 5/2008 |
| WO | 2009019860 | 2/2009 |

OTHER PUBLICATIONS

"Notice of Allowance Issued in Russia Patent Application No. 2012108087", dated Apr. 16, 2015, 12 Pages. (W/o English Translation).

Karlson, et al., "FaThumb: A Facet-based Interface for Mobile Search", In Proceedings of the SIGCHI Conference on Human Factors in Computing Systems, Apr. 27, 2006, pp. 711-720.

"Fourth Office Action Issued in Chinese Patent Application No. 201080039294.9", dated Oct. 11, 2014, 6 Pages.

"Office Action Issued in Russian Federation Patent Application No. 2012108087", dated Feb. 5, 2015, 5 Pages. (W/O English Translation).

"Office Action Issued in Japan Patent Application No. 2012-527923", dated Jul. 31, 2014, 4 Pages.

"Notice of Allowance Issued in Chinese Patent Application No. 201080039294.9", dated Mar. 2, 2015, 2 Pages.

Japan Office Office Action in Application No. 2012527923 dated Apr. 10, 2014, 3 pages.

"Free search engine 'Solr', Mechanism, configuration and application of enterprise search" written by Shogo Akimoto and printed in DB Magazine vol. 18, No. 3 published by Shoeisha on Jul. 1, 2008 (pp. 124-136).

Navigation and search, Designing web navigation ("Optimizing the User Experience" written by James Kalbach published by O'Reilly Japan) published by Ohm Co., Ltd. dated May 22, 2009, ISBN: 978-4-87311-410-1 (pp. 274-293).

"Notice of Allowance Issued in Australia Patent Application No. 2010289713", dated Apr. 30, 2014, 2 Pages.—No New Refs.

Tyrone Hopes—Revision http://www.thetyro.com/rev/asp.html, pp. 1-5, 2009.

Deliverable D7.6 Report on User Interface Design and Community Experiments http://dspace.ou.nl/bitstream/1820/1765/1/Mace%20Deliverable%207.6%20Report%20on%20User%20Interface%20Design%20and%20Community%20Experiments.pdf, pp. 1-42, 2008.

Facet Mapping with LINQ, Part 1 http://geekswithblogs.net/jolson/archive/2008/05/30/facet-mapping-with-linq-part-1.aspx, pp. 1-3.

Office Action Issued in Canadian Patent Application No. 2,770,053, dated Jun. 28, 2016, 5 Pages.

European Search Report dated Sep. 5, 2016 in European Patent Application No. 10814316.5, 11 pages.

Shane 0 'Neill et al: "New Microsoft Search Engine Bing Finds Google Weaknesses", IT Business, Jun. 4, 2009 (Jun. 4, 2009), pp. 1-5, XP055294469, Retrieved from the Internet: URL:http://www.itbusiness.ca/news/new-microsoft-search-engine-bing-finds-google-weaknesses/13608 [retrieved on Aug. 9, 2016].

"Office Action Issued in Canadian Patent Application No. 2,770,053", dated Mar. 30, 2017, 4 Pages.

"Office Action Issued in European Patent Application No. 10814316.5", dated Oct. 23, 2017, 10 Pages.

"Office Action Issued in Korean Patent Application No. 10-2012-7005707", dated Jun. 18, 2016, 4 Pages.

"Office Action Issued in Canadian Patent Application No. 2,770,053", dated Feb. 27, 2018, 5 Pages.

* cited by examiner

TABLE OF CONTENTS FOR SEARCH QUERY REFINEMENT

CROSS-REFERENCE TO RELATED APPLICATIONS

This application is a continuation of, and claims priority from, U.S. patent application Ser. No. 12/554,466, filed Sep. 4, 2009, entitled "TABLE OF CONTENTS FOR SEARCH QUERY REFINEMENT" which is incorporated herein by reference in its entirety.

BACKGROUND

The current state of user search interfaces relies primarily on query parsing and matching to large lists of potential results. The user is burdened with sifting through these large lists to obtain the information he or she is seeking. The search results presented to the user are often muddled by long complex user queries, which increase the time required to generate the search results and often result in a strange amalgam of results related to individual terms within the complex query.

SUMMARY

Embodiments of the present invention generally relate to systems, methods, and computer-storage media having computer-executable instructions embodied thereon that, when executed, perform methods for providing a user interface for exploring facets relevant to a user search query term, wherein a state of the user search query is maintained. Utilizing the systems, methods, and media described herein, a user search query is received at a front end engine, which sends the user search query to a back end server. The back end server generates facets, or categories of relevant topics, which are received by the front end engine to be rendered into a Table of Contents or TOC. The TOC displays these facets to be selected by the user and once a facet is selected, the selected facet is sent to the back end server. Together with the recalled original search query term, the selected facet is used to generate a refined search results list. The user may continue to browse the refined search result list or select another facet of the original search query term to explore. Since the state of the original search query is maintained throughout the browsing session, a user may explore various aspects of the search query term using the facets presented in the TOC. In alternate embodiments, the TOC may include a set of sub facets or sub categories of each facet to further refine the search query term. In other embodiments, the TOC may incorporate static facets to provide general categories for refining the browsing session.

Embodiments of the invention are defined by the claims below, not this summary. A high-level overview of various aspects of the invention are provided here for that reason, to provide an overview of the disclosure, and to introduce a selection of concepts that are further described below in the detailed-description section below. This summary is not intended to identify key features or essential features of the claimed subject matter, nor is it intended to be used as an aid in isolation to determine the scope of the claimed subject matter.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
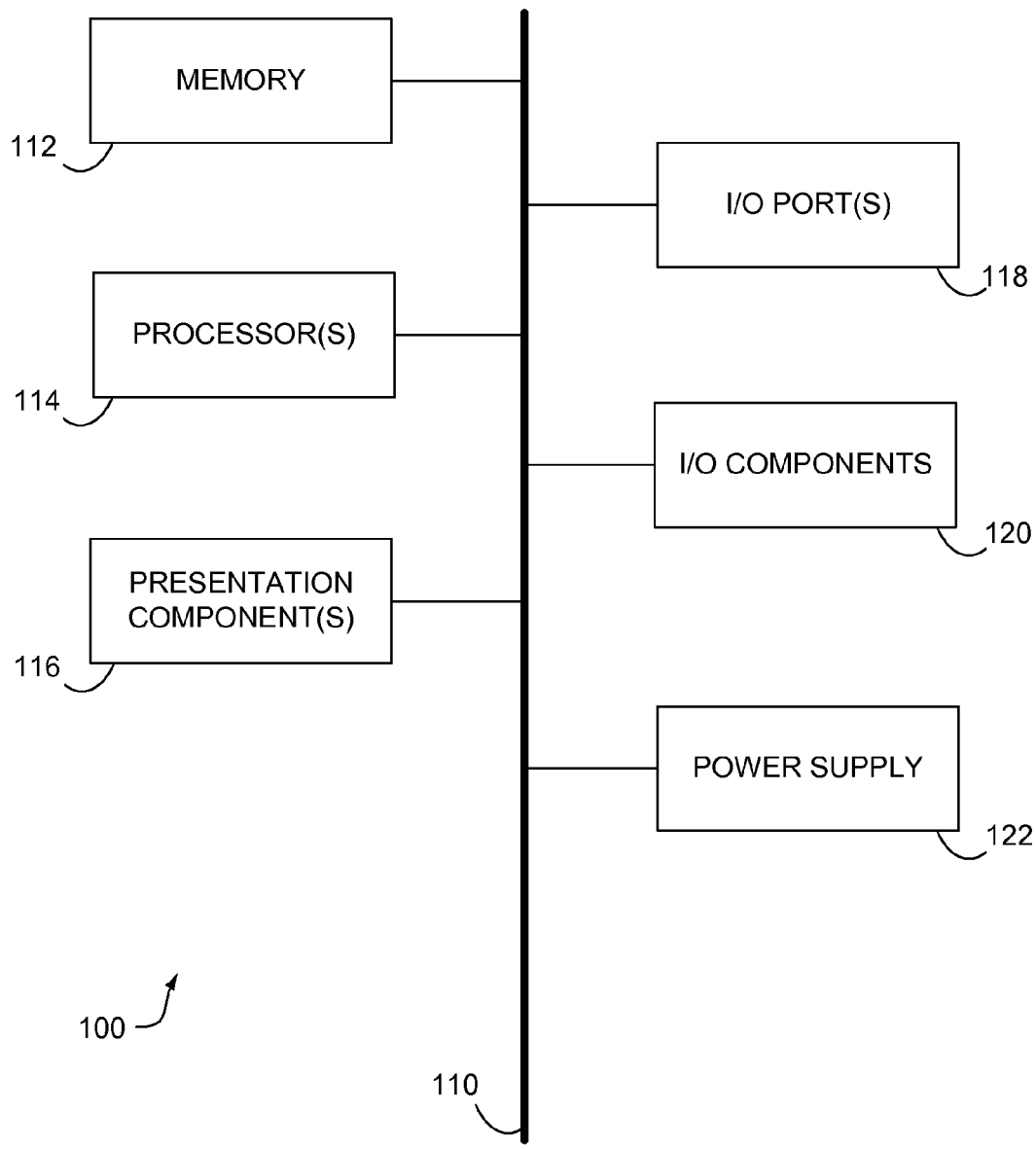
FIG. 1 is a block diagram of an exemplary computing environment suitable for use in implementing embodiments of the present invention

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

The present invention relates generally to providing a user interface for exploration and refinement of user generated queries. Users are moving away from employing single-query searches and pursuing more extended query sessions. Attempting to explore aspects of a query using a standard search leads to reduced user satisfaction with search result accuracy. Users often resort to long complex queries to force more relevant search results; however, this strategy generally does not produce the desired effect. The Table of Contents or TOC provides a user interface wherein the user inputs a search query term and is provided with search query term specific facets, which categorize and organize various aspects of the search query term. The user may then explore and navigate these facets while staying within the original topic of the search query term. Selection of the facets refines the search query term and may be used to generate more focused and relevant search results.

In a first aspect of the invention, a set of computer-useable instructions provide a method for providing a TOC Navigation Model or user interface to be executed on a processor of a computing device. The method in one embodiment includes receiving at least one search query term generated by a user. The search query term is used to generate at least one facet, categorizing topics relevant to the search query term. The generated facets are received and displayed to the user. The user may select a particular facet he or she wishes to explore further and the selected facet with the original search query term is used to generate a refined search result list, which is displayed to the user. The user may then choose to explore these search results or continue selecting and navigating through the facets of the original search query term. Since the original search query term or the state is maintained, the user may easily explore all facets of the search query term.

In another aspect of the invention, a set of computer-useable instructions provide a method for providing a TOC user interface to be executed on a processor of a computing device. The method in one embodiment includes receiving at least one search query term generated by a user. The search query term is used to generate at least one facet, categorizing topics relevant to the search query term. The generated facets are received and displayed to the user. The user may select a particular facet he or she wishes to explore further and the selected facet with the original search query term is used to generate at least one sub facet, which is displayed to the user. The user may choose to select a sub facet, which is used with the selected facet and the search query term to generate a refined search results list. The user may then choose to explore the displayed search results for the selected sub facet or select another sub facet. In one embodiment, the user may select a new facet to display a new set of relevant sub facets. Since the original search query term or the state is maintained, the user may easily explore all facets and all sub facets of the search query term.

In another embodiment of the present invention, a computerized system provides the facet generation and maintenance of the search state for the TOC navigation model. A front end engine receives the search query term and passes this to a back end server. The back end server may in one embodiment store the search query term. In another embodiment, the front end engine may re-send the search query term with each navigation step. Once the search query term is received by the back end server, a number of algorithms are used to generate facets, which categorize topics relevant to the search query term. These generated facets are returned to the front end engine, which displays these facets in the user interface in a TOC. The user may select a facet to explore further which is sent to the back end server. In one embodiment, the back end server may recall the original search query term from a local database. In another embodiment, the front end engine may re-send the original search query term with the selected facet to the back end engine. In either case, the state of the original user query is maintained. Using the selected facet and the search query term, the back end server generates a refined list of search results. These search results are returned to the front end engine, which renders the search result in the TOC for the user to peruse. The user may choose to explore these search results or continue selecting other facets to navigate.

In another embodiment of the present invention, a computerized system provides the facet and sub facet display and generation as well as the maintenance of the search state for the TOC navigation model. A front end engine receives the search query term and passes this to a back end server. The back end server may in one embodiment store the search query term. In another embodiment, the front end engine may re-send the search query term with each navigation step. Once the search query term is received by the back end server, a number of algorithms are used to generate facets, which categorize topics relevant to the search query term. These generated facets are returned to the front end engine, which displays these facets in the user interface in a TOC. The user may select a facet to explore further which is sent to the back end server. In one embodiment, the back end server may recall the original search query term from a local database. In another embodiment, the front end engine may re-send the original search query term with the selected facet to the back end engine. In either case, the state of the original user query is maintained. Using the selected facet and the search query term, the back end server generates a set of sub facets. These sub facets are returned to the front end engine, which renders the sub facets in the TOC for the user to peruse. The user may choose to explore these sub facets or continue selecting other facets to navigate. If the user selects a sub facet, the front end engine sends the selected sub facet to the back end server. The selected sub facet, the selected facet, and the search query term are used to generate a refined search result list, which is returned to the front end engine for TOC display. The user may choose to explore the search result list for the selected sub facet or continue navigating through facets for the original search query term.

In one aspect of the invention, the TOC model may be displayed in a user interface embodied on a web browser. The search results provided to the user may be a set of web links for navigating internet sites relevant to the search query term In another aspect of the invention, the TOC navigation model may include a set of static facets, which may also be employed to refine the search query term.

Having briefly described in an overview of the present invention, an exemplary operating environment in which various aspects of the present invention may be implemented is now described. Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialty computing devices, and the like. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Additionally, many processors have memory. The inventors hereof recognize that such is the nature of the art, and reiterates that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer-storage media and communication media. Computer-storage media includes both volatile and nonvolatile, removable and non-removable media implemented in any method or technology for storage of information such as computer-readable instructions, data structures, program modules or other data. Computer-storage media includes, but is not limited to, Random Access Memory (RAM), Read Only Memory (ROM), Electronically Erasable Programmable Read Only Memory (EEPROM), flash memory or other memory technology, CD-ROM, digital versatile disks (DVD) or other holographic memory, magnetic cassettes, magnetic tape, magnetic disk storage or other magnetic storage devices, or any other medium that can be used to encode desired information and which can be accessed by the computing device 100.

The memory 112 includes computer-storage media in the form of volatile and/or nonvolatile memory. The memory 112 may be removable, non-removable, or a combination thereof. Exemplary hardware devices include solid-state memory, hard drives, optical-disc drives, etc. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative I/O components 120 include a microphone, joystick, game pad, satellite dish, scanner, printer, wireless device, and the like.

Figure 2:
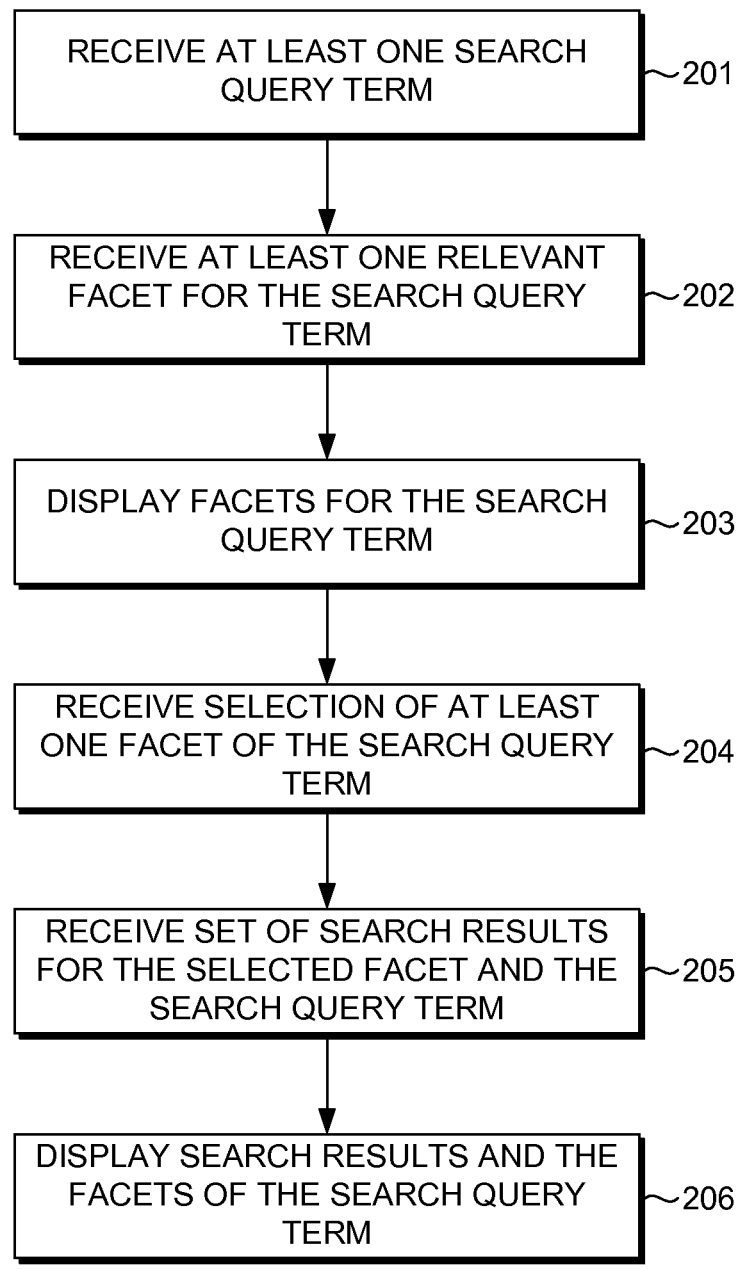
FIG. 2 is a flow diagram illustrating an embodiment of the method of providing a user interface for exploring facets relevant to a user search query term, wherein a state of the user search query is maintained.

FIG. 2 is a flow chart depicting an illustrative method for providing a user interface for exploring facets relevant to a user search query term, wherein a state of the user search query is maintained. A search query term may be any subject that the user wishes to explore or research. Typically, the search query term may be quite broad and yield thousands of results that are organized into facets. A facet may be any categorization of relevant topics relevant to the user search query term. Facets used to organize the typically enormous and often chaotic search result list generated by search engines. Generally, in a search environment wherein the state is not maintained or where the state is not apparent to the user, the user enters a search query term and a set of search results are returned. As the user selects a desired search term to investigate further, the state of the search navigates away from the original search query term. In this manner, the state is not maintained, or if it is maintained, it is not apparent to the user. In the exemplary method, the user can navigate between various facets while maintaining the state of the original search query term. The computer useable instructions for performing this embodiment 200 may be written on a computer readable media and executed on a processor of a computing device. The invention is broadly applicable and may be employed on a wide variety of computing devices used for executing the computer useable instructions such as personal computers, super computers, computing clusters, game consoles, mp3 players, electronic books, mobile computing devices, cellular phones, PDAs, etc. The method illustrated in 200 is an embodiment for providing a user interface for exploring facets relevant to a user search query term wherein the facets categorize topics related to the at least one search query term. The facets allow the user to refine the at least one search query term.

In step 201, at least one search query term is received in one embodiment at a front end engine. The front end engine may be embodied at a computing device providing the user interface or may be accessed remotely via a computing device providing the user interface. The front end engine in one embodiment provides the TOC interface for the user to interact with the generated facets and search results. The at least one search query term may be applied to a back end server, such as a search engine, or similar device which generates at least one facet or a set of facets based upon dictionary-based algorithms. A search engine utilizes algorithms and human input to search web pages, images, and other types of files. An exemplary search engine may incorporate a web crawler which retrieves a vast set of web pages and then indexes them according to content. The facets are search query term specific and may be selected by any method for determining categories relevant to a search term. Examples of facet selection will be discussed in subsequent embodiments.

The generated facets for the search query term are received 202 and displayed 203 to the user. In an exemplary method, the front end engine may receive and display the generated facets in the form of a Table of Contents (TOC) Navigation Model or user interface. A TOC may be a graphical or text-based user interface that displays and allows selection of the generated facets and search results by the user during the browsing session. The TOC also provides a browsing session wherein the state of the session is maintained and as the user selects different facets, the original search query term is recalled. The user may select a facet that he or she wishes to explore further 204, for example by clicking on the facet displayed in the TOC. In response to the user selection, a set of search results relevant to the selected facet and the search query term is displayed 205. In an exemplary method, the front end engine may display the TOC with the facets relevant to the search query term and the list of search results relevant to the selected facet and the search query term. The search results may include a list of relevant websites. The user may explore the displayed results or select another relevant facet of the search query term in order to display a new set of search terms relevant to the new selected facet and the search query term. This method demonstrates that the search query term state is maintained throughout the user search experience of navigating facets of the search query term.

The state of the search query term may be maintained by any number of protocols, for example, the original search query term may be saved in a database associated with the facet generating device or back end server. In an alternative embodiment, an IP address or other source identifier may be associated with the search query term during storage. Upon receiving a selected facet or other user selection, the source identifier of the new selection is matched with the identifier of the original search query term and the matched selected facet and search query term are used to generate subsequent results at the back end server. In another embodiment, the original search query term may be stored in a front end engine which resends the search query term with each selected facet. In another embodiment, the search query term may be stored in a separate auxiliary database to be recalled when necessary by either the front end engine or the back end server. In either embodiment, any selection of a relevant facet maintains state by recalling the original search query term.

In an alternative embodiment, in addition to receiving relevant facets for the search query term, a set of search results relevant to the entire search query term may be received and displayed. The user has the choice between using the TOC based facets to explore relevant aspects of the search query term or exploring individual search results relevant to the search query term. The alternative embodiment would allow the user to explore all search results while maintaining the state of the original search query term and quickly narrow down the search results by selecting facets.

The method may be executed on a computer connected to internet and the display may include a web browser. In one embodiment, the search results may include Uniform Resource Identifiers(URIs) and the facets relevant to a user search query term may categorize the URIs relevant to a particular search query term. In one embodiment the user search query term is sent to a search engine which is configured to generate relevant facets based upon the returned search terms and various dictionary sources. In another embodiment, a set of static facets may be displayed to the user along with the generated relevant facets. For example, static facets may include categories of document types or chronological headings. Static facets are universal headings for search queries that are not specific to the user search query term but serve as additional means for limiting the user search and aiding in the user search experience. In another embodiment, a prompt may be displayed to the user for input of the search query term.

Figure 3:
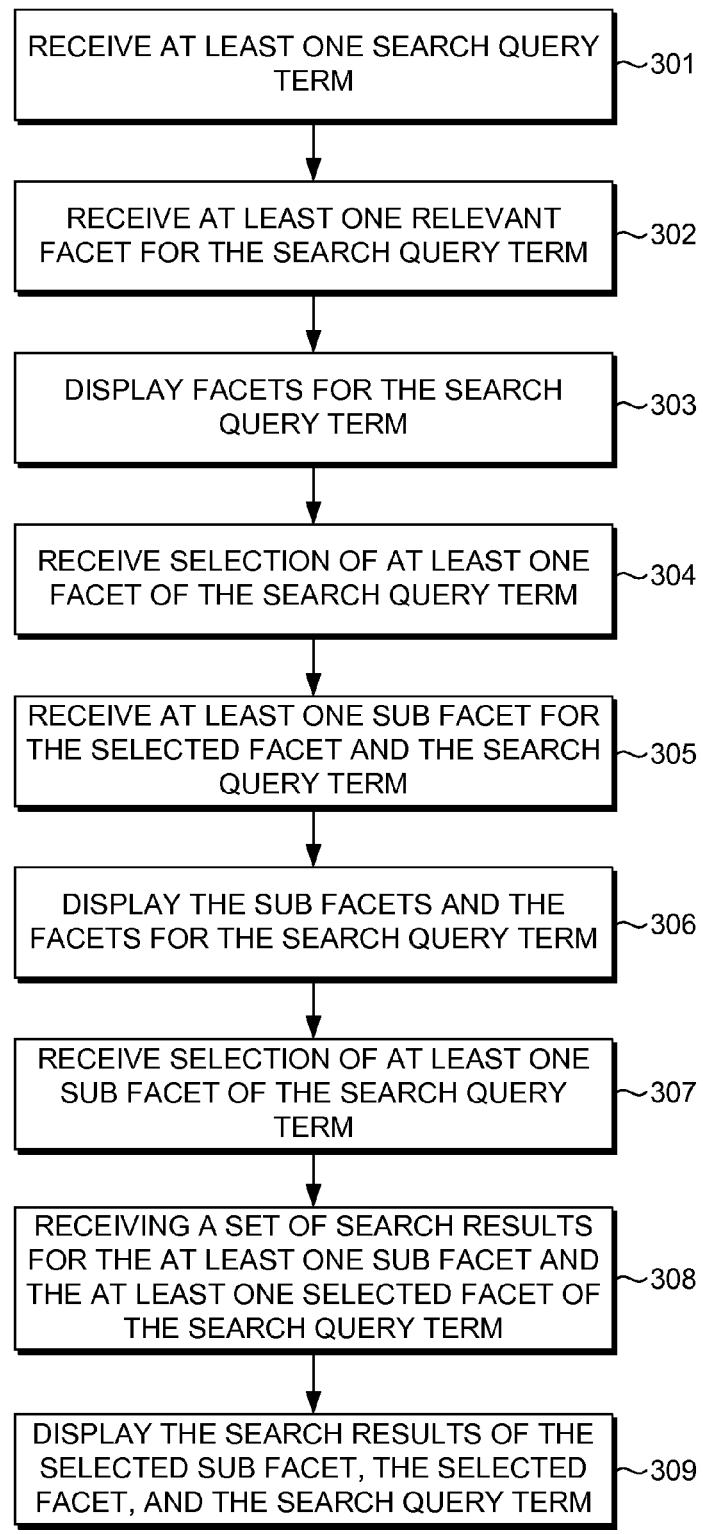
FIG. 3 is a flow diagram illustrating an alternative embodiment of the method of providing a user interface for exploring facets relevant to a user search query term, wherein a state of the user search query is maintained.

FIG. 3 is a flow chart illustrating an alternative embodiment of the present invention. The method depicted allows a user to explore facets related to a search query term while maintaining the state of the original search query term. In this exemplary method, sub facets are provided to the user in order to further refine the search query term and produce relevant search results to the user. The computer useable instructions for performing this embodiment 300 may be written on a computer readable media and executed on a processor of a computing device. The invention is broadly applicable and may be employed on a wide variety of computing devices that execute computer useable instructions such as personal computers, super computers, computing clusters, game consoles, mp3 players, electronic books, mobile computing devices, cellular phones, PDAs, etc.

The method illustrated in 300 is an embodiment for providing a user interface for exploring facets and sub facets relevant to a user search query term wherein the facets categorize topics related to the at least one search query term. In the exemplary method, the at least one search query term is received 301, for example, by the front end engine. The search query term is then used to generate at least one relevant facet which categorizes a set of topics related to the at least one search query term. The at least one relevant facet may be generated by any means for categorizing relevant topics. In one embodiment, a back end server may receive the search query term and produce a set of facets. The facets may be generated by any method for determining categories relevant to a search query term. Examples of facet selection will be described in following paragraphs.

The at least one relevant facet for the search query term is received 302 and displayed 303 to the user. In one embodiment, the facets are displayed in the form of a TOC. The user selects at least one relevant facet to refine the search query 304 and at least one sub facet relevant to the selected facet and the search query term is received 305. In one embodiment, a back end server may receive the selected facet and produce a set of sub facets based upon dictionary and user data-seeded algorithms. An exemplary sub facet is a sub category of the category of relevant topics described by the facet. Any facet may have a number of sub facets, the presentation of which may be useful to a user in refining the topic he or she is searching. Once the sub facets for the selected facet and search query term are received 305, the sub facets and facets for the search query term are displayed 306. In one embodiment, the front end engine renders the sub facets and facets into a TOC. The user then selects a sub facet he or she wishes to further explore 307 and a set of search results for the selected sub facet, the selected facet, and the search query term are received 308 and displayed 309. In an exemplary environment, the received data is displayed in a TOC.

The state of the search query term may be maintained in one embodiment by storing the search query term in a database which is accessed during facet and sub facet generation. Once a user selects a facet, that facet may be stored as well for access during sub facet generation. In an alternative embodiment, the state of the search query term may be maintained by resending the original search query term from the front end engine each time a facet or a sub facet is selected. Once a user selects a facet, that facet may be resent during sub facet generation. In either embodiment, any selection of a relevant facet maintains state by recalling the original search query term.

In an alternative embodiment, in addition to receiving relevant facets and sub facets for the search query term, a set of search results relevant to the search query term may be received and displayed. In this embodiment, a user may simply navigate between the displayed search results or choose to refine the displayed results by selecting applicable facets. The alternative embodiment would allow the user to explore all search results while maintaining the state of the original search query term and quickly narrow down the search results by selecting facets and sub facets.

The method may be executed on a computer connected to internet and the display may include a web browser. In one embodiment, the search results may include Uniform Resource Identifiers and the facets relevant to a user search query term may categorize the URIs relevant to a particular search query term. In one embodiment the user search query term is sent to a search engine which is configured to generate relevant facets based upon the returned search terms and various dictionary sources. In another embodiment, a set of static facets may be displayed to the user along with the generated relevant facets. For example, static facets may include categories of document types or chronological headings. Static facets are universal headings for search queries that are not specific to the user search query term but serve as additional means for limiting the user search and aiding in the user search experience. In another embodiment, a prompt may be displayed to the user for input of the search query term.

Figure 4A:
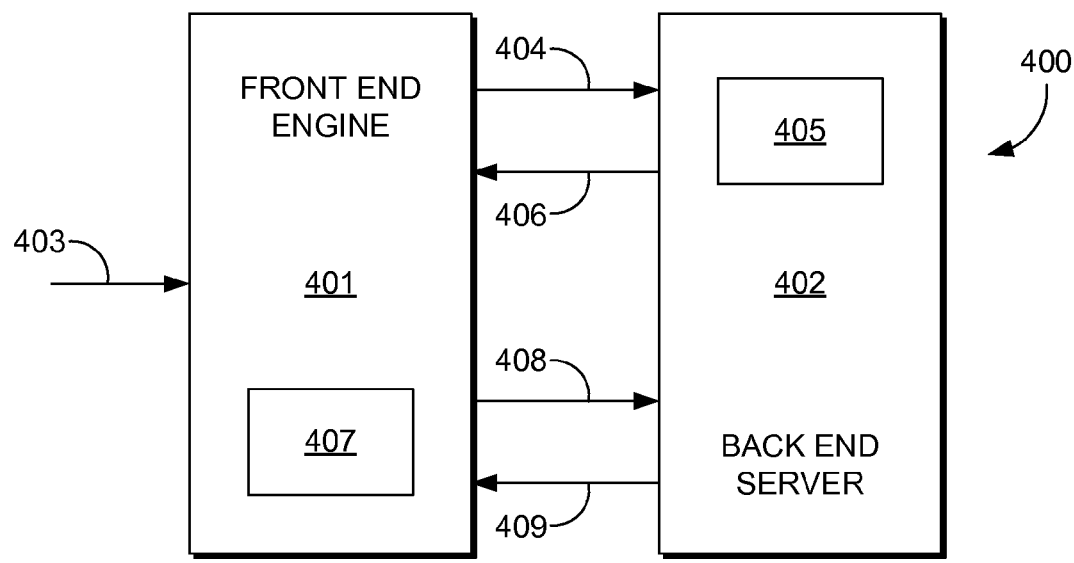
FIG. 4A-B are block diagrams illustrating the functional components of a computerized system for providing a user interface for exploring facets relevant to a user search query, wherein a state of the user search query is maintained.

FIG. 4A is a block diagram depicting one embodiment of the claimed invention. A user generated search query term is received at 403 at a front end engine 401. The front end engine may be embodied together with or separately from the back end server 402. In either case, processes performed at the front end engine 401 and the back end server 402 may be written onto a computer readable media and executed on a processor of any computing device. The front end engine 401 sends the search query term at 404 to the back end engine 402 wherein the search query term is stored in a database 405. The back end server 402, such as a search engine, determines what facets or categories are most relevant to the search query term. The back end server 402 includes any algorithms necessary to accomplish this task or any other processes available for facet generation. For example, the back end server 402 may include query logs of categories most accessed in relation to a search query term as well as query specialization algorithms. The back end server may utilize stored dictionaries to establish categorization for a search query term. Algorithms within the back end server may be employed to break down the dictionary into a smaller more easily accessible set. The dictionary algorithms may be used expand upon categories associated with a search query term or determine synonyms for categories. Various random generation algorithms may also be employed.

Once the facets are generated at the back end server 402, they are received at 406 by the front end engine 401. In one embodiment a Table of Contents (TOC) generator 407 creates a display of the relevant facets for the user. The user may then select a facet to explore further and the selection of the facet is sent at 408 from the front end engine 401 to the back end engine 405. In order to maintain the state of the user search experience, the original search query term may be recalled from the database 405 and the selected facet and the search query term are used to refine a set of search results. The set of search results for the selected facet and the search query term are sent at 409 and received by the front end engine 401, which renders the TOC 407. The user may explore the displayed search results or select another facet to explore.

Figure 4B:
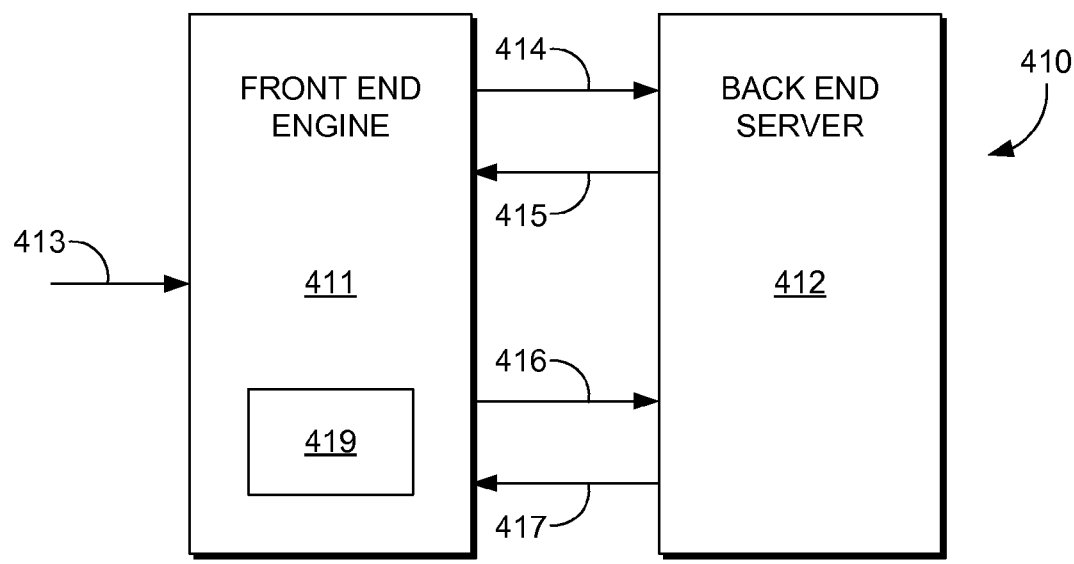

FIG. 4B is a block diagram 410 depicting an alternative embodiment of the present invention. At 413, a user generated search query term is received at a front end engine 411. The front end engine may be embodied together with or separately from the back end service 412. In either case, processes performed at the front end engine 411 and the back end server 412 may be written onto a computer readable media and executed on a processor of any computing device. The search query term is passed at 414 to the back end server 412, which generates at least one facet relevant to the search query term using, in one embodiment, random walk and dictionary based algorithms. The generated facets are returned at 415 to the front end engine 411 and rendered into a TOC 419. The user may select a facet he or she wishes to explore further and the selected facet is returned with the original search query term 416 to the back end server 412. Additional embodiments may include a database for search query term storage at the front end engine 411. The back end server 412 then utilizes the selected facet to refine the search query term to generate a list of search results. The search results of the selected facet and the search query term are returned 417 to the front end engine 411 and displayed in the TOC. The user may then explore these search results or select another facet to explore. In either case the state of the original search query term is maintained and the user does not have to re-enter the original search query term in order to retain the original search parameters.

Figure 5A:
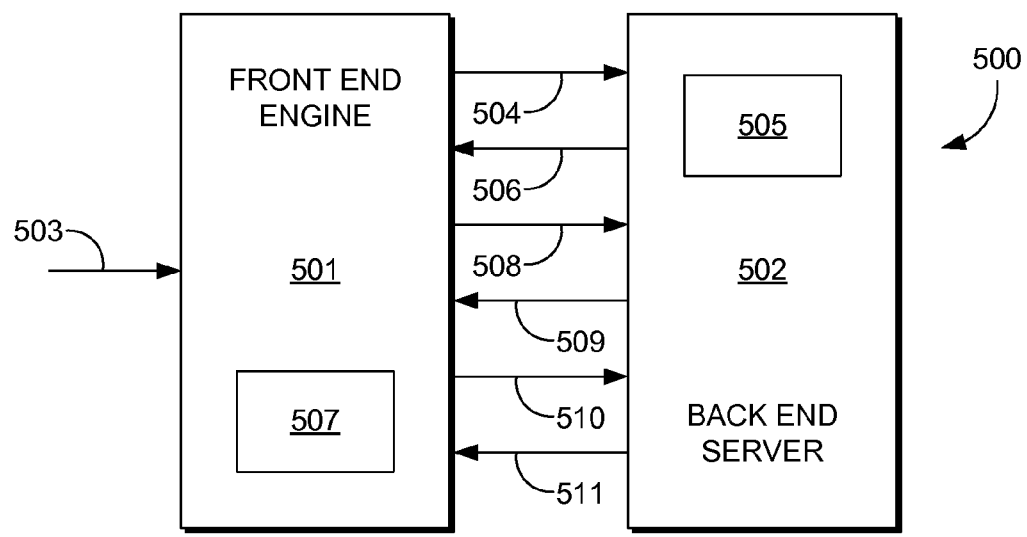
FIG. 5A-B are block diagrams illustrating an alternative embodiment of a computerized system for providing a user interface for exploring facets relevant to a user search query, wherein a state of the user search query is maintained.

FIG. 5A is a block diagram 500 illustrating an alternative embodiment of the present invention. This embodiment also includes a front end engine 501 and a back end server 502. The front end engine may be embodied together with or separately from the back end server 502. In either case, processes performed at the front end engine 501 and the back end server 502 may be written onto a computer readable media and executed on a processor of any computing device. A user generated query is received 503 at the front end engine 501 and passed at 504 to the back end server 502. In one embodiment, the search query term may be stored in a database 505 associated with the back end server 502. The back end server 502 generates at least one facet relevant to the search query term using any appropriate computing method including random walk and dictionary based algorithms. The generated facets are returned at 506 to the front end engine 501, which renders these facets of the search query term into a TOC display 507. The user may then select a particular facet he or she wishes to explore further. The selected facet is sent at 508 to the back end server 502. In order to maintain the state of the user search experience, the original search query term may be recalled from the database 505 and the selected facet and the search query term are used to generate a set of sub facets. The set of sub facets for the selected facet and the search query term are sent 509 and received by the front end engine 501, which renders the TOC 507. The user may then choose to explore sub facets related to another facet by selecting an alternate facet or choose to explore a specific sub facet of the currently selected facet. In one embodiment, the selected facet may also be stored in a database associated with the back end engine and at this point, when the selected sub facet 510 is sent by the front end engine, the selected facet and the search query term would both be recalled. Using the recalled selected facet and the recalled search query term as well as the selected sub facet, a set of search results refined based upon this criteria is generated by the back end engine 502. These search results are sent at 511 to the front end engine 501, which renders the search results in the TOC display 507. The user may explore the displayed search results or select another facet or sub facet to explore while the state of the original search query term is maintained.

Figure 5B:
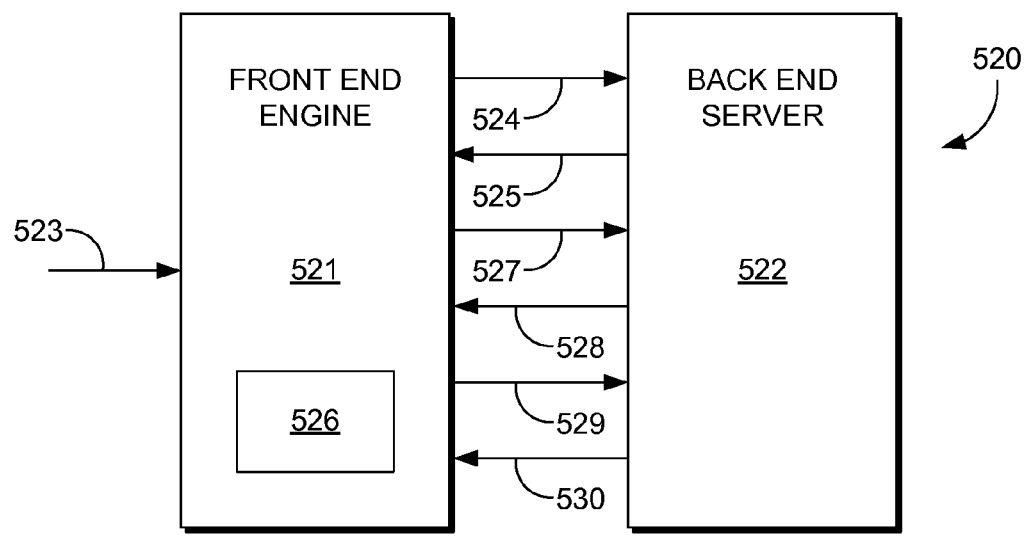

FIG. 5B is a block diagram 520 illustrating an alternative embodiment of the present invention. This embodiment also includes a front end engine 521 and a back end server 522. The front end engine may be embodied together with or separately from the back end server 522. In either case, processes performed at the front end engine 521 and the back end server 522 may be written onto a computer readable media and executed on a processor of any computing device. A user generated query is received at 523 at the front end engine 521 and passed at 524 to the back end server 522. The back end server 522 generates at least one facet relevant to the search query term using any appropriate computing method including random walk and dictionary based algorithms. The generated facets are returned at 525 to the front end engine 501, which renders these facets of the search query term into a TOC display 526. The user may then select a particular facet he or she wishes to explore further. In order to maintain the state of the user search experience, the original search query term sent with the selected facet 527 to the back end server 522 and the selected facet and the search query term are used to generate a set of sub facets. The set of sub facets for the selected facet and the search query term are sent at 528 and received by the front end engine 521, which renders the TOC 526. The user may then choose to explore sub facets related to another facet by selecting an alternate facet or choose to explore a specific sub facet of the currently selected facet. In one embodiment, the selected sub facet, the select facet, and the original search query term are sent at 529 to the back end engine 522 which maintains the state of the search query term. Using the selected facet and the search query term as well as the selected sub facet, a set of search results determined by this criteria is generated by the back end engine 522. These search results are sent at 530 to the front end engine 521, which renders the search results in the TOC display 526. The user may explore the displayed search results or select another facet or sub facet to explore while the state of the original search query term is maintained.

FIG. 6A-D are a series of illustrations depicting an exemplary embodiment of the present invention. In one embodiment shown in FIG. 6A, the user may be provided a graphical user interface 600 by a front end engine 401 of FIG. 4 via a web browser 601. Other embodiments of a user display are within the scope of this invention, for example an offline navigation display or a text only interface. The front end engine may provide a prompt 602 for a user to input a search query term 603. In the example shown in FIG. 6A, the search query term input by a user is "Michael Jackson." Once the user provides the search query term, the search query term is received by the front end engine 401 and sent to the back end server 402. At this point, the state of the search query term may be maintained, as one of many possible embodiments, by storage within a database associated with the back end server 402 or, in another embodiment, it may be stored by front end engine 401 and resent or recalled at a later time. Once the facets associated with the search query term "Michael Jackson" have been determined using any of the above mentioned methods, the facets are returned to the front end engine.

Figure 6A:
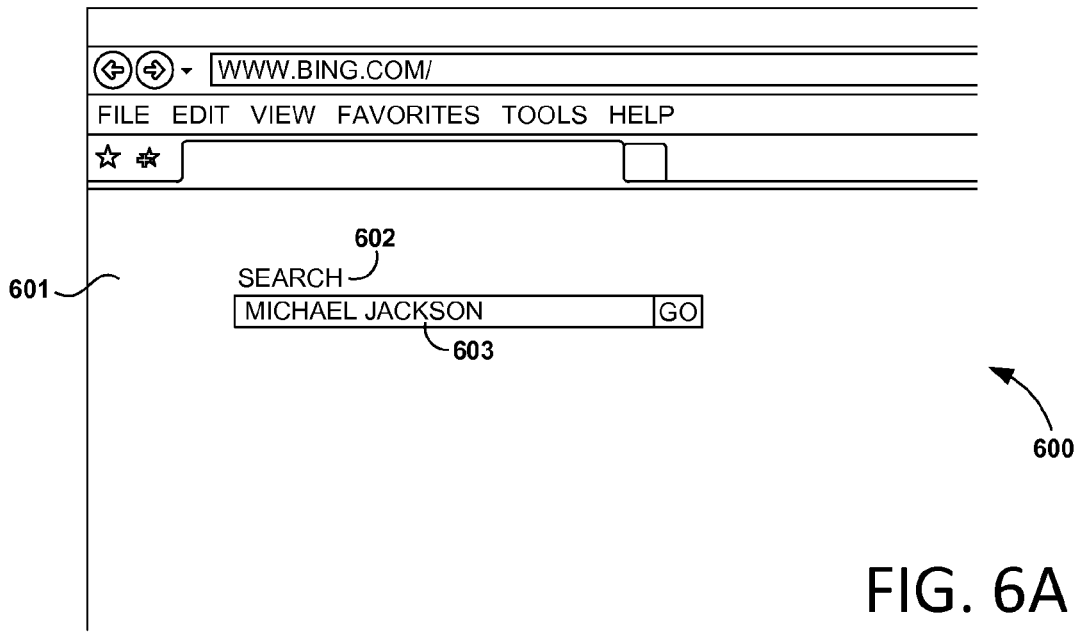
FIG. 6A-D are an exemplary operating environment for the present invention which provides a user interface for exploring facets related to a search query term while maintaining the state of the original search query term.
Figure 6B:
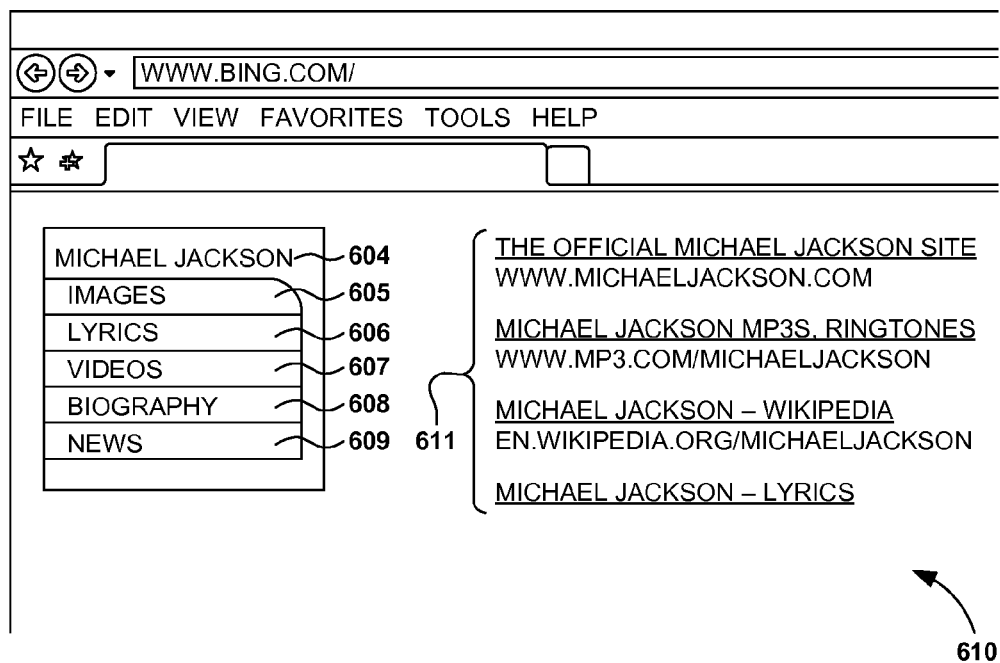

In FIG. 6B in interface 610, the TOC is rendered and shows the facets generated for the search query term "Michael Jackson 604." In this example, the facets selected include: IMAGES 605, LYRICS 606, VIDEOS 607, BIOGRAPHY 608, and NEWS 609. In one embodiment, the back end server may also provide a list of search results 611 for the search query term which are rendered in the interface 610 by the front end engine. The facets selected in one embodiment are dependent on the selection criteria of the back end server 402 of FIG. 4. If a user input a different search query term such as "Wolfgang Mozart," a person of ordinary skill would recognize that the facets generated for a search query term "Michael Jackson" would not necessarily be relevant. For example, a search query term for "Wolfgang Mozart" may produce facets such as: BIOGRAPHY, WORKS, MUSEUMS, FICTIONAL DEPICTIONS. The facets provide search query term specific categories such that a user may explore different aspects of a particular search query term without diverting from the original search query term.

Figure 6C:
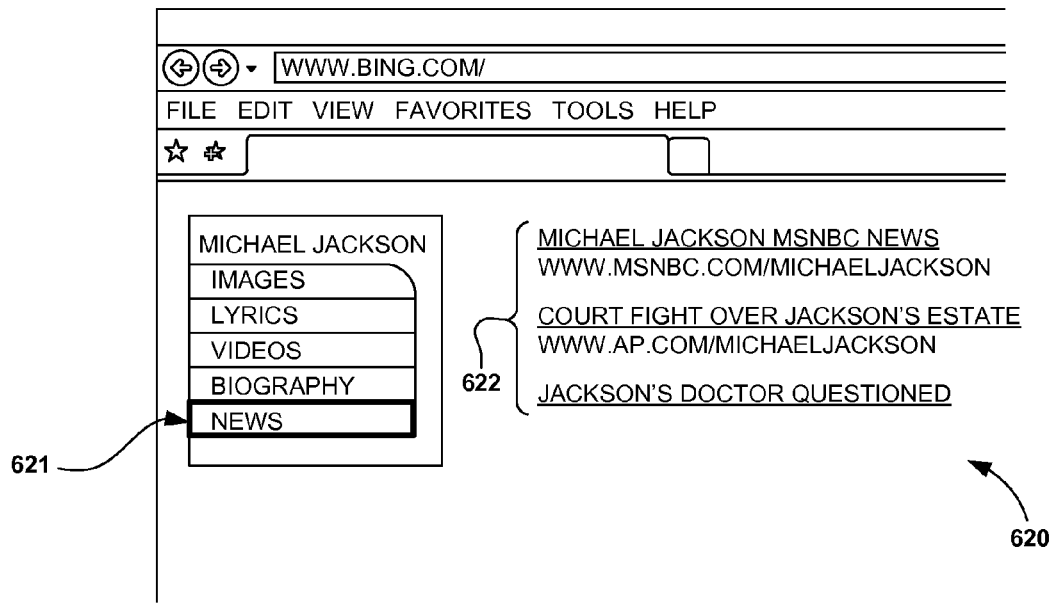

In FIG. 6C in interface 620, a user may select the facet NEWS 621 to explore search results related to "Michael Jackson" and "NEWS." Thus the selection of the facet NEWS 621 is sent by the front end engine to the back end server 402 of FIG. 4. In one exemplary embodiment, the front end engine may send both "Michael Jackson" and "NEWS" to the back end engine. In another embodiment, the front end engine may send "NEWS" to the back end engine, which in turn recalls the search query term "Michael Jackson" from an associated database. A search engine may be employed by the back end server to produce a set of search results for the selected facet "NEWS" and the search query term "Michael Jackson," In this particular example, the search results may be a list of web links. This set of search results is returned to the front end engine, which renders the search results or facet results 622 into the TOC display. The user may then click on any of the links or continue browsing the facets 605-609 associated with the search query term "Michael Jackson."

Figure 6D:
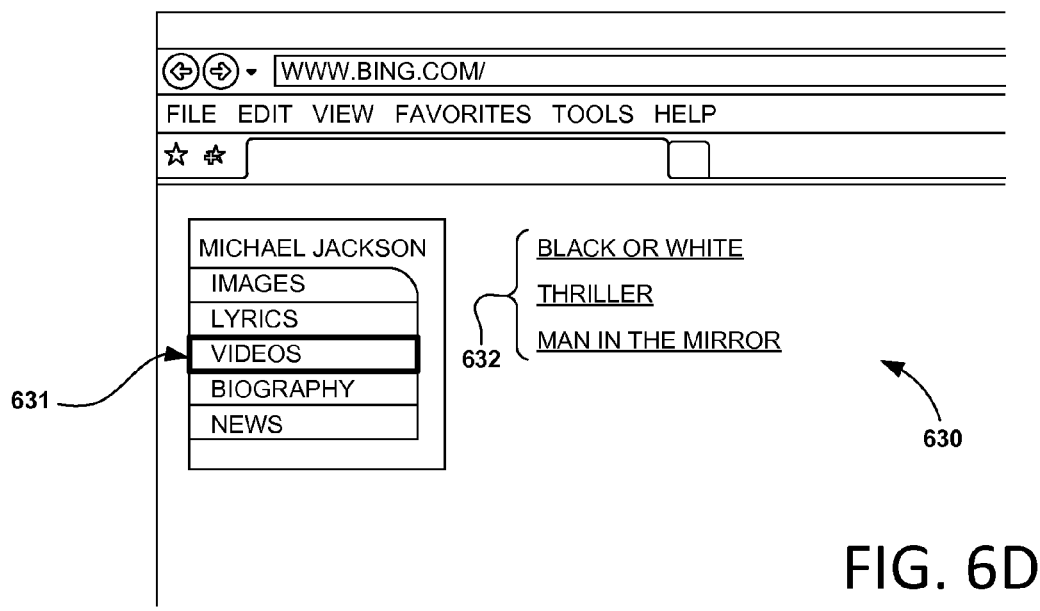

Since the state of the original search query term is maintained, all of the facets 605-609 remain available to the user without having to repeat the input of the original search query term. In FIG. 6D in interface 630, if the user then selects another facet to explore, such as VIDEOS 631, the selected VIDEOS 631 facet is returned to the back end server and the original search query term is supplied as well. The search engine may produce a set of web links relevant to "Videos" and "Michael Jackson." These facet results 632 are rendered in the TOC display for the user to evaluate while the original search query term is still available.

FIG. 7A-D are a series of illustrations depicting an exemplary embodiment of the present invention. In one embodiment shown in FIG. 7A in display 700, the user may be provided an interface by a front end engine 501 of FIG. 5 via a web browser 701. Other embodiments of a user display are within the scope of this invention, for example an offline navigation display or a text only interface. The front end engine may provide a prompt 702 for a user to input a search query term 703. In the example shown in FIG. 7A, the search query term input by a user is "Michael Jackson." Once the user provides the search query term, the search query term is received by the front end engine 501 of FIG. 5 and sent to the back end server 502. At this point, the state of the search query term may be maintained, as one of many possible embodiments, by storage within a database associated with the back end server 502 or, in another embodiment, it may be stored in a buffer associated with the front end engine 501. Once the facets associated with the search query term "Michael Jackson" have been determined using any of the above mentioned methods, the facets are returned to the front end engine.

Figure 7A:
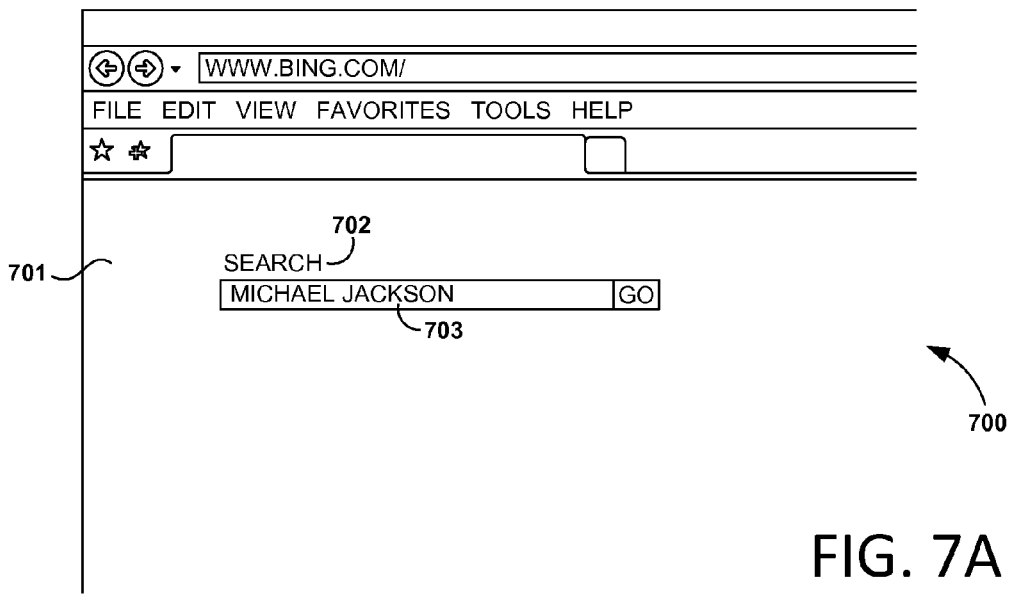
FIG. 7A-D are an alternative embodiment of the operating environment for the present invention, which includes the use of sub facets to further refine the user search experience.
Figure 7B:
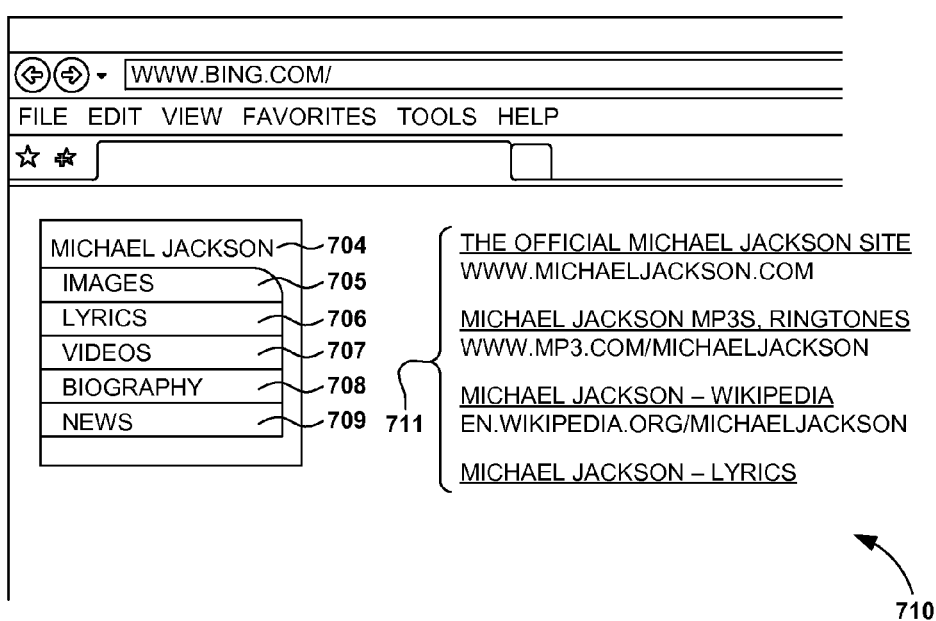

In FIG. 7B in display 710, the TOC is rendered 704 and shows the facets generated for the search query term "Michael Jackson." In this example, the facets generated include: IMAGES 705, LYRICS 706, VIDEOS 707, BIOGRAPHY 708, and NEWS 709. In one embodiment, the back end server may provide a list of search results 711 for the search query term which are received and rendered in the interface 710 by the front end server. The facets selected in one embodiment are dependent on the selection criteria of the back end server 502 of FIG. 5. If a user input a different search query term such as "Wolfgang Mozart," a person of ordinary skill would recognize that the facets generated for a search query term "Michael Jackson" would not necessarily be relevant. For example, a search query term for "Wolfgang Mozart" may produce facets such as: BIOGRAPHY, WORKS, MUSEUMS, FICTIONAL DEPICTIONS. The facets provide search query term specific categories such that a user may explore different aspects of a particular search query term without diverting from the original search query term.

Figure 7C:
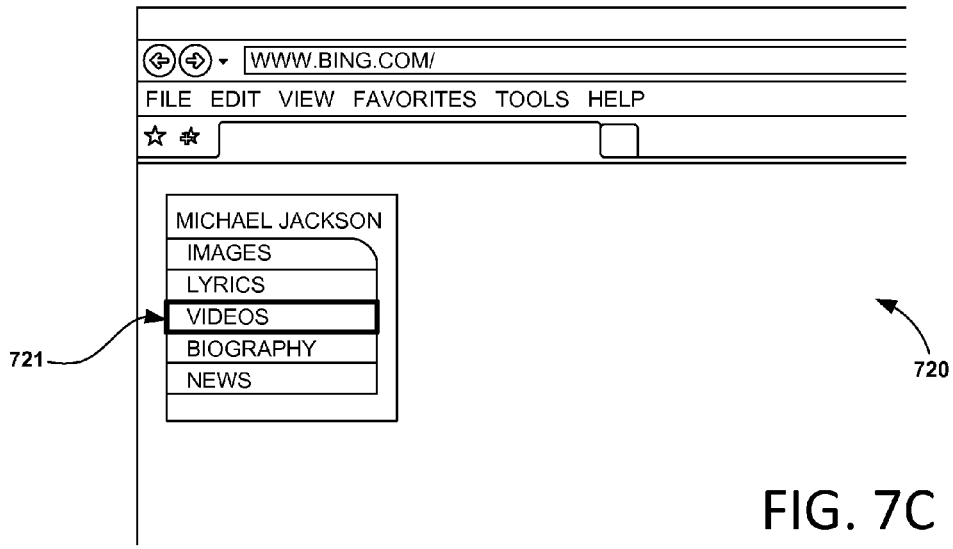

In FIG. 7C in display 720, a user may select the facet VIDEOS 721 to explore sub facets related to "Michael Jackson" and "VIDEOS." Thus the selection of the facet VIDEOS 721 is sent by the front end engine 501 to the back end server 502 of FIG. 5. In one exemplary embodiment, the front end engine may send both "Michael Jackson" and "VIDEOS" to the back end engine. In another embodiment, the front end engine may send "VIDEOS" to the back end engine, which in turn recalls the search query term "Michael Jackson" from an associated database. At the back end server 502, the sub facet generation is accomplished in a manner similar to facet generation using exemplary random walk and dictionary based algorithms In this embodiment, sub facets for VIDEOS and Michael Jackson are generated and returned to the front end engine.

Figure 7D:
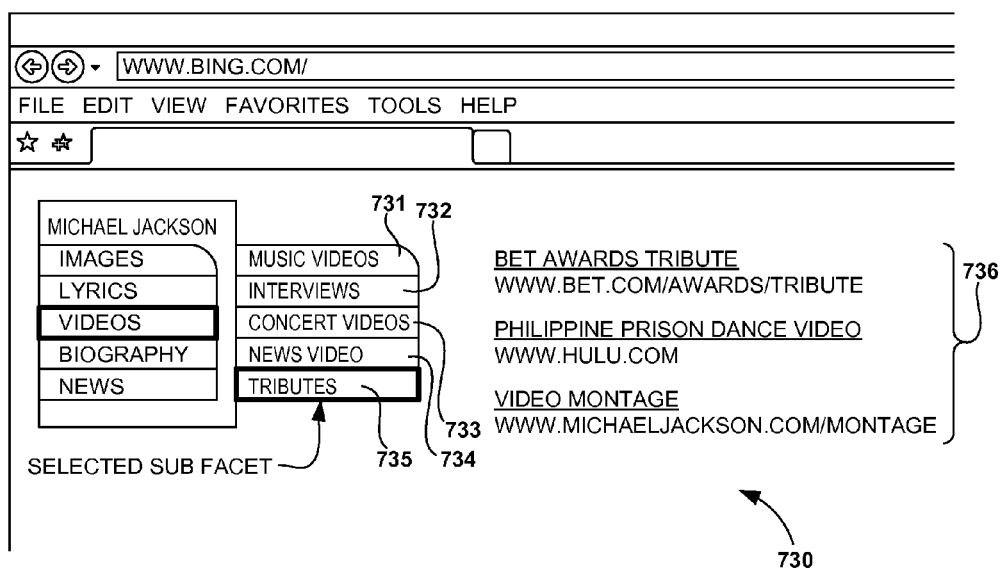

In FIG. 7D in display 730, an exemplary embodiment of the TOC including the generated sub facets is shown. Once the sub facets for "Michael Jackson" and "VIDEOS" are received by the front end engine 501 of FIG. 5, the sub facets are rendered into the TOC display. In the embodiment, sub facets for the search query term "Michael Jackson" and "VIDEOS" may include MUSIC VIDEOS 731, INTERVIEWS 732, CONCERT VIDEOS 733, NEWS VIDEO 734, and TRIBUTES 735. A person would recognize that this set of sub facets are unique to the search query term "Michael Jackson" and "VIDEOS." A sub facet for "Wolfgang Mozart" and "WORKS" would yield possible sub facets such as SYMPHONIES, OPERAS, CONCERTOS, SONATAS, and CHAMBER MUSIC. The user may then explore the sub facets displayed for the search query term "Michael Jackson" and "VIDEOS" or the user may select a new facet to trigger the generation of another set of sub facets. In an exemplary embodiment, a user selects a sub facet TRIBUTES 735. Thus the selection of the sub facet TRIBUTES 735 is sent by the front end engine to the back end server 502 of FIG. 5. In one exemplary embodiment, the front end engine may send "Michael Jackson" and "VIDEOS" and "TRIBUTES" to the back end engine. In another embodiment, the front end engine may send "TRIBUTES 735" to the back end engine, which in turn recalls the search query term "Michael Jackson" and the facet "VIDEOS" from an associated database. In either case, the back end server 502 generates a list of search results which are refined by the search query term, "Michael Jackson," the selected facet "VIDEOS," and the selected sub facet "TRIBUTES." These sub facet results are returned to the front end engine which renders these search results for the selected sub facet in the TOC display 736. The user may then choose to explore the sub facet web links 736 relevant to the sub facet "TRIBUTES" displayed 735 in the exemplary embodiment or select another sub facet relevant to the facet "VIDEOS" or select another facet relevant to the original search query term "Michael Jackson." Since the state of the search query term is maintained, the user may fully explore all facets and sub facets relevant to "Michael Jackson" in the exemplary embodiment without re-entering the original search criteria.

Figure 8A:
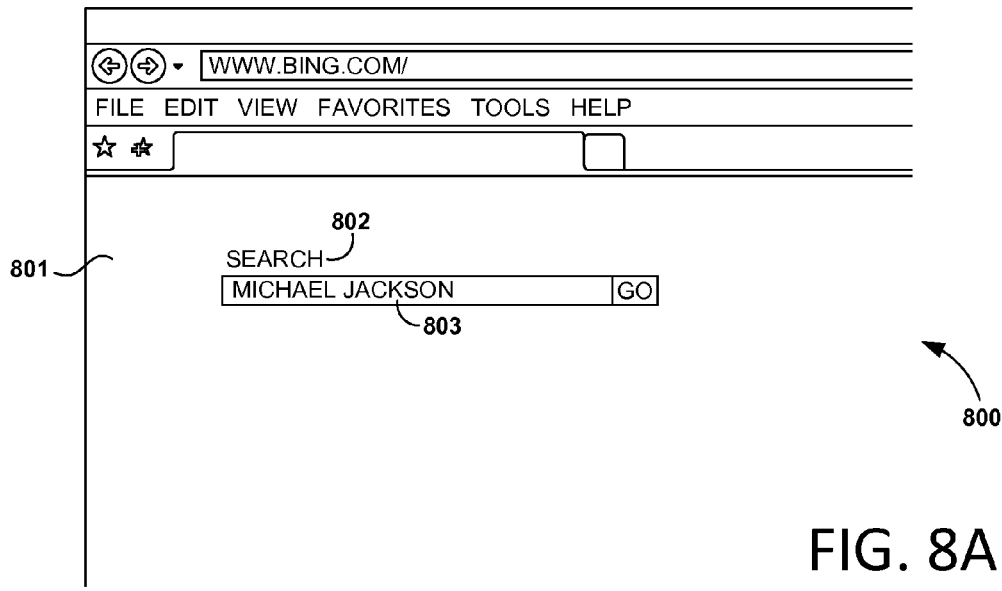
FIGS. 8A-B are an additional embodiments of the operating environment for the present invention including the incorporation of static facets.
Figure 8B:
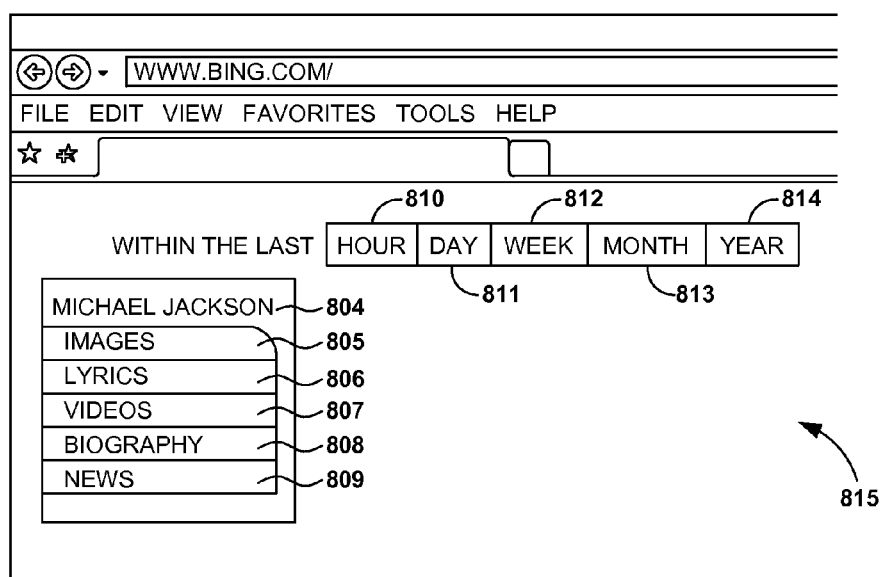

FIG. 8A-B are illustrations of an alternative embodiment of the present invention. In the exemplary embodiment, the facets generated for the search query term are augmented with a set of static facets which are displayed for any search query term. In one embodiment shown in FIG. 8A in display 800, the user may be provided an interface by a front end engine 401 of FIG. 4 via a web browser 801. Other embodiments of a user display are within the scope of this invention, for example an offline navigation display or a text only interface. The front end engine may provide a prompt 802 for a user to input a search query term 803: in the example shown in FIG. 8A, the search query term input by a user is "Michael Jackson." Once the user provides the search query term, the search query term is received by the front end engine 401 and sent to the back end server 402 of FIG. 4. At this point, the state of the search query term may be maintained, as one of many possible embodiments, by storage within a database associated with the back end server 402 or, in another embodiment, it may be stored in a buffer associated with the front end engine 401. Once the facets associated with the search query term "Michael Jackson" have been determined using any of the above mentioned methods, the facets are returned to the front end engine.

In FIG. 8B in interface 815, the TOC is rendered 804 and shows the facets generated for the search query term "Michael Jackson." In this example, the facets generated include: IMAGES 805, LYRICS 806, VIDEOS 807, BIOGRAPHY 808, and NEWS 809. The facets selected in one embodiment are dependent on the selection criteria of the back end server 402 of FIG. 4. If a user input a different search query term such as "London," a person of ordinary skill would recognize that the facets generated for a search query term "Michael Jackson" would not necessarily be relevant. For example, a search query term for "London" may produce facets such as: HISTORY, TOURISM, BUSINESSES, NEWS. The facets provide search query term specific categories such that a user may explore different aspects of a particular search query term without diverting from the original search query term, i.e. maintaining the state. In addition to the search query term specific facets 806-809, a set of static facets are provided by the front end engine 401. In the exemplary embodiment, the static facets are a set of chronological categories indicating results for the last HOUR 810, DAY 811, WEEK 812, MONTH 813, and YEAR 814. Certainly other static facets might be useful as well, such as document type facets such as refining results to ".DOC," ".PDF," ".MP3," and ".MPG," or source based facets for example narrowing results to only ".COM" URLS or ".GOV" URLS. The static facets are not generated for each search query term and are not search query term specific but may be selected by the user to further refine the results for a search query term. In a similar manner as described above, a selected static facet and/or a selected facet are sent to the back end server which also accesses the original search query term and uses these criteria to produce a set of search results. These search results are returned to the front end engine which in turn renders the search results into the facet results portion of the TOC display. Similarly, sub facets may also be employed if a user selects a facet in conjunction with a static facet.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more memory devices having computer-executable instructions embodied thereon that, when executed, perform a method for providing a user interface, the method comprising:

receiving a search query term;

communicating, to a back end server, the search query term to cause a first set of search results and a set of facets for the search query term to be generated, wherein the query term is associated with a first identifier;

receiving, from the back end server, the first set of search results and the set of facets for the search query term;

causing display of the first set of search results and the set of facets for the search query term;

receiving a selected facet from the set of facets;

communicating, based on receiving the selected facet from the set of facets, to the back end server, both the selected facet and the search query term to cause a second set of search results based on the selected facet and the search query term, to be generated;

matching a second identifier of the selected facet to the first identifier of the search query term, wherein the combination of operations of communicating the search query term to the back end server and matching the second identifier to the first identifier, supports maintaining a state of the search query term in that communicating the search query term along with the selected facet and matching the second identifier to the first identifier operates as an indication that the set of facets corresponding to the search query term are to remain available for display;

receiving, from the back end server, the set of facets for the search query term and a second set of search results, the set of facets is received based on communicating the search query term;

based on receiving the set of facets for the search query term and the second set of search results, causing concurrent display of:

(1) the second set of search results based on the search query term and the selected facet; and (2) the set of facets corresponding to the search query term, wherein the state of the search query term is maintained based on communicating the search query term.

2. The method of claim 1, wherein the second set of search results are generated using the search query term and the selected facet as a refinement query.

3. The method of claim 1, further comprising:
causing display of a set of sub facets, wherein the set of sub facets are generated using the search query term and the selected facet as a refinement query.

4. The method of claim 1, further comprising:
causing display a graphical indication highlighting the selected facet.

5. The method of claim 1, further comprising:
causing display of one or more static facets, wherein the static facets allow the user to refine search results.

6. The method of claim 1, the method further comprising:
receiving a second selected facet; and
causing display of a third set of search results, wherein the third set of search results are generated using the search query term and the second selected facet as a refinement query.

7. One or more memory devices having computer-executable instructions embodied thereon that, when executed, perform a method for providing a user interface, the method comprising:

receiving a search query term;

communicating the search query term to cause a first set of search results and a set of facets for the search query term to be generated, wherein the query term is associated with a first identifier;

receiving the first set of search results and the set of facets for the search query term;

causing display of the first set of search results and the set of facets for the search query term;

receiving a selected facet from the set of facets, wherein the selected facet from the set of facets is associated with a second identifier;

communicating both the selected facet and the search query term to cause a second set of search results and set of sub facets, based on the selected facet and the search query term, to be generated;

matching the second identifier of the selected facet to first identifier of the search query term, wherein the combination of operations of communicating the search query term and matching the second identifier to the first identifier, supports maintaining a state of the search query term, in that communicating the search query term along with the selected facet and matching the second identifier to the first identifier operates as an indication that the set of facets corresponding to the search query term are to remain available for display;

causing display of the set of facets corresponding to the search query term, wherein the state of the search query term is maintained based on communicating the search query term; and causing display of the second set of search results and the set of sub facets, wherein the set of sub facets are generated using the search query term and the selected facet as a refinement query.

8. The method of claim 7, further comprising:
receiving a selected sub facet; and
causing display of a third set of search results and the set of sub facets.

9. The method of claim 7, wherein the third set of search results are generated using the search query term, the selected facet, and the selected sub facet as a refinement query.

10. The method of claim 8, further comprising:
causing concurrent display of:
(1) a first graphical indication highlighting the selected facet; and
(2) a second graphical indication highlighting the selected sub facet.

11. The method of claim 7, the method further comprising:
causing display of one or more static facets, wherein the static facet allows the user to refine search results.

12. The method of claim 7, the method further comprising:
receiving a selected static facet; and
refining the second set of search results using the selected static facet.

13. One or more memory devices having computer-executable instructions embodied thereon that, when executed, perform a method for providing a user interface, the method comprising:

receiving a search query term;

storing the search query term in a database, wherein the search query term is associated with a first identifier;

generating a set of facets for the search query term;

communicating for display the set of facets for the search query term;

receiving a selected facet from the set of facets;

storing the selected facet, wherein the selected facet is associated with a second identifier;

matching the second identifier of the selected facet to the first identifier of the search query term, wherein the combination of operations of receiving the selected facet and matching the second identifier to the first identifier supports maintaining the state of the search query term corresponding to the set of facets when the selected facet corresponds to a facet in the set of facets of the search query term, wherein the selected facet that corresponds to the facet in the set of facets operates as an indication that the set of facets corresponding to the search query term will remain available on display, wherein maintaining comprises:
(1) recalling the search query term from the database; and
(2) re-generating the set of facets of the search query term; and
communicating for display the set of facets.

14. The method of claim 13, wherein storing the search query term further comprises:
wherein the first identifier and the second identifier are source identifiers used to identify the selected facet as corresponding the search query term.

15. The method of claim 13, further comprising:
receiving a second selected facet from the set of facet; and
maintaining the state of the search query term corresponding to the set of facets when the second selected facet corresponds to the set of facets of the search query term, wherein maintaining comprises:
(1) recalling the search query term from the stored location;
(2) re-generating the set of facets of the search query term and a set of sub facets for the search query term and the second selected facet.

16. The method of claim 15, further comprising:
communicating for display the set of facets and the set of sub facets.

17. The method of claim 13, further comprising:
receiving a selected sub facet; and
maintaining the state of the search query term corresponding to the set of facets and the set of sub facets when the selected sub facet corresponds to the set of sub facets of the search query term.

18. The method of claim 13, the method further comprising:
communicating for display one or more static facets, wherein the static facets allow the user to refine search results.

19. The method of claim 18, the method further comprising:
receiving a selected static facet; and
refining a set of search results for the search query term using the selected static facet.

20. The method of claim 13, further comprising:
receiving a second search query term, wherein a second set of facets for the second search query term does not correspond to the set of facets of the search query term;
communicating for display second set of facets for the second search query term such that a state of the first set of facets is not maintained.

* * * * *